(12) United States Patent
Hsu

(10) Patent No.: US 8,447,356 B2
(45) Date of Patent: May 21, 2013

(54) MOBILE PHONE AND METHOD OF UTILIZING DIAL TELEPHONE IN COMMUNICATION

(75) Inventor: Ying-Hao Hsu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 109 days.

(21) Appl. No.: 13/235,444

(22) Filed: Sep. 18, 2011

(65) Prior Publication Data

US 2013/0029724 A1 Jan. 31, 2013

(30) Foreign Application Priority Data

Jul. 29, 2011 (TW) .............................. 100127146 A

(51) Int. Cl.
*H04B 1/38* (2006.01)
*H04B 1/00* (2006.01)
*H04M 11/04* (2006.01)
*H04M 3/42* (2006.01)
*H04W 24/00* (2009.01)

(52) U.S. Cl.
USPC ..................... 455/557; 455/404.1; 455/414.1; 455/457; 455/575.1; 455/575.2

(58) Field of Classification Search
USPC ................. 455/404, 414.1, 457, 575.1–575.4
See application file for complete search history.

(56) References Cited

U.S. PATENT DOCUMENTS

| | | | |
|---|---|---|---|
| 7,369,872 B2 * | 5/2008 | Lee et al. .................... | 455/550.1 |
| 7,460,655 B2 * | 12/2008 | Fujisawa et al. ......... | 379/106.01 |
| 7,478,972 B2 * | 1/2009 | Takamori et al. .......... | 403/409.1 |
| 7,667,148 B2 * | 2/2010 | Mansfield et al. ............ | 200/5 R |
| 2011/0300900 A1 * | 12/2011 | Fleming et al. ............... | 455/555 |

* cited by examiner

*Primary Examiner* — Andrew Wendell
*Assistant Examiner* — Maryam Soltanzadeh
(74) *Attorney, Agent, or Firm* — Altis Law Group, Inc.

(57) ABSTRACT

The disclosure provides a mobile phone and a method of utilizing a dial telephone in communication by the mobile phone. The mobile phone is electrically connected to the dial telephone via an audio interface and positioned on a dial plate of the dial telephone, and is rotated with the dial plate. The mobile phone stores a plurality of relationships between sensing parameters and numbers. A user of the mobile phone dials numbers via the dial plate, the mobile phone senses the number-dialing operations, dials out the dialed numbers, and makes a call via a receiver of the dial telephone, thus, it is no need to physically hold the mobile phone to communicate, thereby reducing the amount of radiation received by the user.

8 Claims, 4 Drawing Sheets

MOBILE PHONE AND METHOD OF UTILIZING DIAL TELEPHONE IN COMMUNICATION

BACKGROUND

1. Technical Field

The disclosure relates to mobile phones and, more particularly, to a mobile phone and a method of utilizing a dial telephone in communication, adapted for the mobile phone.

2. Description of Related Art

When a user of a mobile phone makes a call, the mobile phone is very near to the head of the user and the full strength of any radiation emitted from the mobile phone will be received by the user.

Therefore, what is needed is a mobile phone to overcome the described shortcoming.

DETAILED DESCRIPTION

Figure 1:
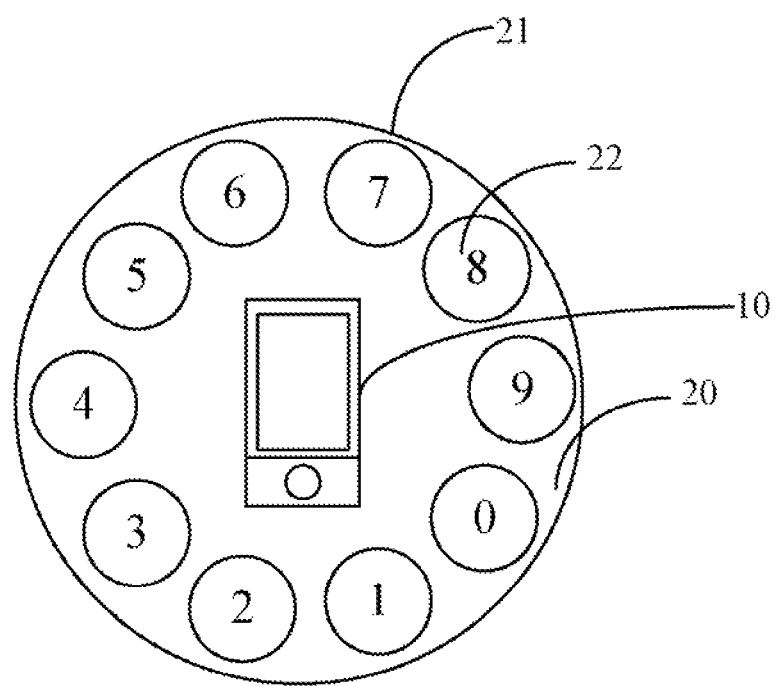
FIG. 1 is a schematic view of a mobile phone positioned on a dial plate of a dial telephone, in accordance with an exemplary embodiment.

FIG. 1 is an isometric view of a mobile phone positioned on the dial plate of a dial telephone, in accordance with an exemplary embodiment. For example, the mobile phone 10 is positioned in the middle of the dial plate 21. The mobile phone 10 is electrically connected to the dial telephone 20. The mobile phone 10 rotates as the dial plate 21 is rotated. In the embodiment, the dial plate 21 defines ten degrees or angles of rotation (rotation locations 22), for example, the ten rotation locations 22 are marked as the ten digits from 0 to 9. A reference location is defined between the locations of the digits "6" and "7". The dial plate 21 may be rotated by finger pressure for a predetermined angle from the reference location in response to user operations. When a finger of a user is lifted from the dial plate 21, the dial plate 21 returns to the reference location.

For example, the dial plate 21 may be rotated 10 angles clockwise from the reference location and stop on the location marked "8" in response to a first number-dialing operation by the user, and when the user lifts his finger from the dial plate 21, the dial plate 21 returns to the reference location from the location marked "8"; the dial plate 21 rotates 10 angles back (anticlockwise) from the reference location and stops on the location marked "5" in response to a second number-dialing operation from the user, and when the user lifts his finger from the dial plate 21, the dial plate 21 returns to the reference location from the location marked "5".

Figure 2:
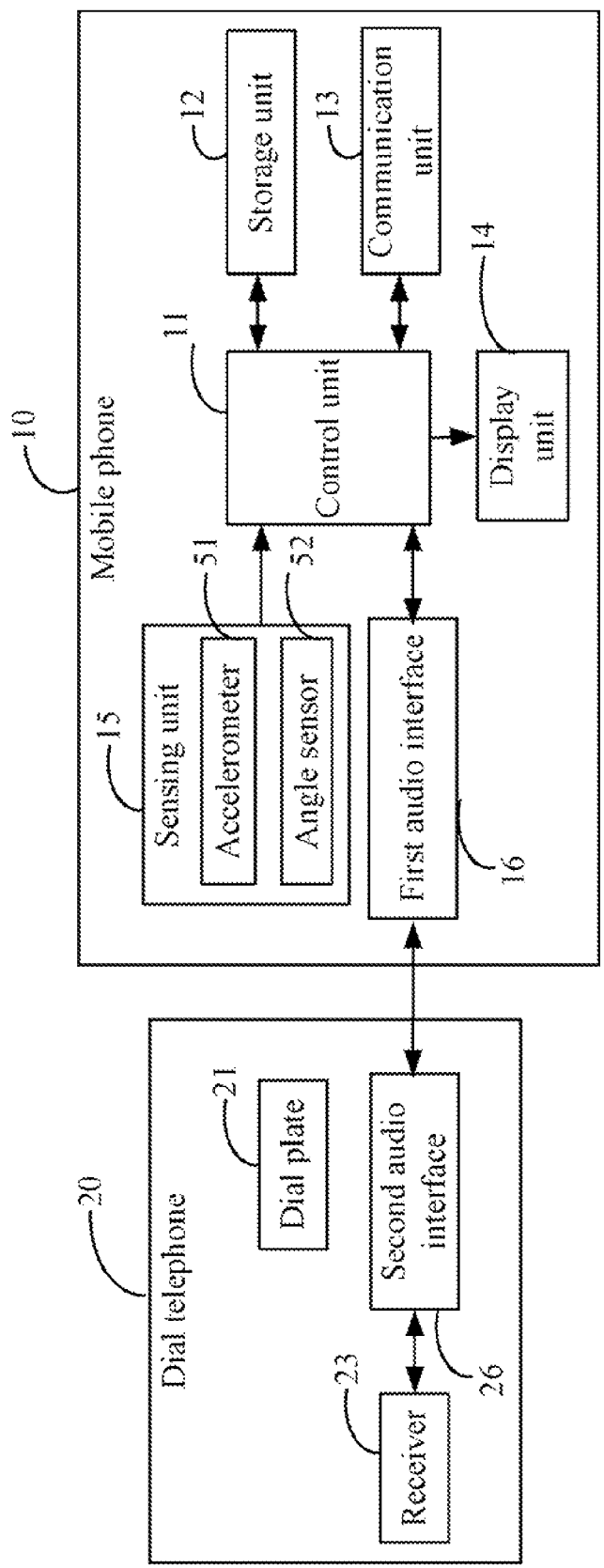
FIG. 2 is a block diagram of the mobile phone and the dial telephone of FIG. 1.

As shown in FIG. 2, the mobile phone 10 includes a control unit 11, a storage unit 12, a communication unit 13, a display unit 14, a sensing unit 15, and a first audio interface 16. The dial telephone 20 includes the dial plate 21, a receiver 23, and a second audio interface 26. The first audio interface 16 is electrically connected to the second audio interface 26.

The sensing unit 15 is configured to sense the angle and the orientation through which the mobile phone 10 is rotated with the dial plate 21 in response to the number-dialing operation, and to generate a sensing parameter signal. The sensing unit 15 further includes an accelerometer 51 and an angle sensor 52. The accelerometer 51 is configured to sense the change in orientation as the mobile phone 10 rotates. The angle sensor 52 is configured to sense the change in the angle as the mobile phone 10 rotates. The mobile phone 10 is rotated with the dial plate 21, therefore, the accelerometer 51 senses the orientation of the dial plate 21 as it is rotated and the angle sensor 52 senses the angle through which the dial plate 21 is rotated. In the embodiment, the sensing unit 15 is a three-axis gyroscope.

The storage unit 12 is configured to store a number of relationships between sensing parameters and numbers. For example, the sensing unit 15 senses a preset angle along a preset orientation from the rotation of the mobile phone 10 and generates a predetermined sensing parameter signal, and the storage unit 12 stores the number "1" associated with the corresponding predetermined sensing parameter.

Figure 3:
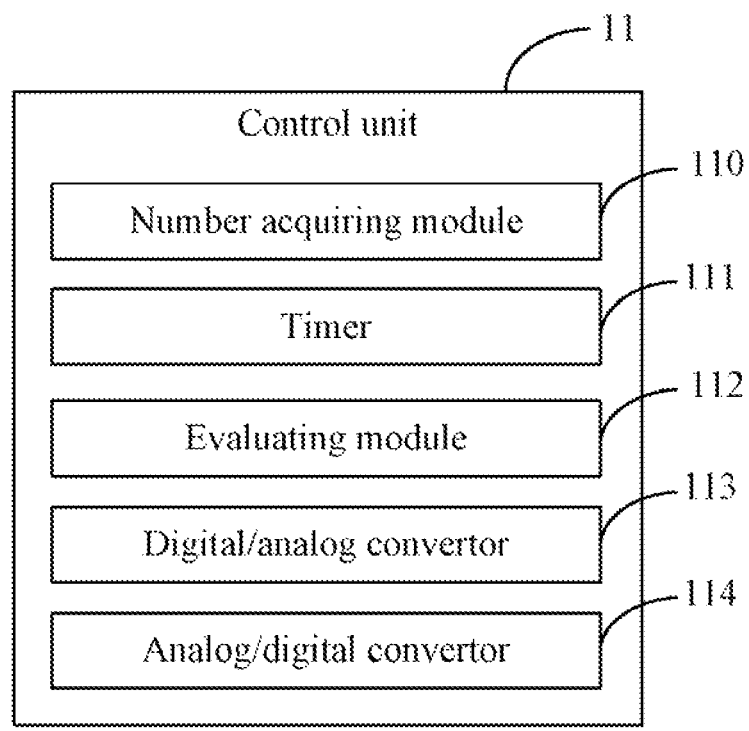
FIG. 3 is a block diagram of a control unit of the mobile phone of FIG. 2.

The communication unit 13 is configured to receive and send wireless signals through a wireless communication system (not shown). The display unit 14 is configured to display information. The control unit 11 is configured to control the mobile phone 10. As shown in FIG. 3, the control unit 11 includes a number acquiring module 110, a timer 111, an evaluating module 112, a digital/analog convertor 113, and an analog/digital convertor 114.

The number acquiring module 110 is configured to acquire a number which corresponds to a sensing parameter from the storage unit 12 according to the corresponding sensing parameter signal and to control the display unit 14 to display the number. For example, when the sensing unit 15 senses that the dial plate 21 has been rotated from the reference location to the location marked "5" and generates a corresponding sensing parameter signal, the number acquiring module 110 acquires the number "5" according to the sensing parameter signal and the stored relationships in the storage unit 12 and the display unit 14 displays the number "5". Therefore, once the sensing unit 15 has generated the sensing parameter signal in response to the number-dialing operation, the number acquiring module 110 acquires the corresponding number from the storage unit 12 and the display unit 14 displays the number. If the sensing unit 15 generates ten sensing parameter signals in response to ten number-dialing operations, the number acquiring module 110 acquires ten numbers from the storage unit 12 and the display unit 14 displays the ten numbers.

The evaluating module 112 is configured to evaluate whether all number-dialing operations from the dial plate 21 have finished, and to control the communication unit 13 to dial out the numbers corresponding to all number-dialing operations when all number-dialing operations have finished. In the embodiment, when the number acquiring module 110 acquires a number from the storage unit 12, the timer 111 starts to time and the evaluating module 112 evaluates whether another sensing parameter signal has been received within a predetermined time period, such as 30 seconds. When another sensing parameter signal has not been received within the predetermined time period, that is, the all number-dialing operations have finished, the evaluating module 112 controls the communication unit 13 to dial out the numbers corresponding to the all number-dialing operations. Therefore, the user of the mobile phone 10 may make calls in this way via the dial plate 21 of the dial telephone 20.

The mobile phone 10 establishes a communication link with the called party associated with the selected numbers via the wireless communication system. The communication unit 13 receives audio data from the called party via the wireless communication system, and the digital/analog convertor 113 converts the audio data into analog signals and transmits the analog signals to the second audio interface 26 via the first audio interface 16. The second audio interface 26 is electrically connected with the receiver 23 and the receiver 23 receives the analog signals from the mobile phone 10 as audible sound.

At the same time, the receiver 23 gathers sounds from the user and the second audio interface 26 transmits the sounds to the first audio interface 16. The analog/digital convertor 114 receives the sounds, converts the sounds into digital signals, and controls the communication unit 13 to send the digital signals to the wireless communication system. Therefore, the user of the mobile phone 10 may dial the numbers via the dial plate 21, the mobile phone 10 senses the number-dialing operations, dials out the dialed numbers, and makes a call via the receiver 23, thus, it is no need to physically hold the mobile phone 10 to communicate, it may be operated remotely, and at a safe distance, thereby reducing any deleterious effects of the radiation produced by the mobile phone 10.

Figure 4:
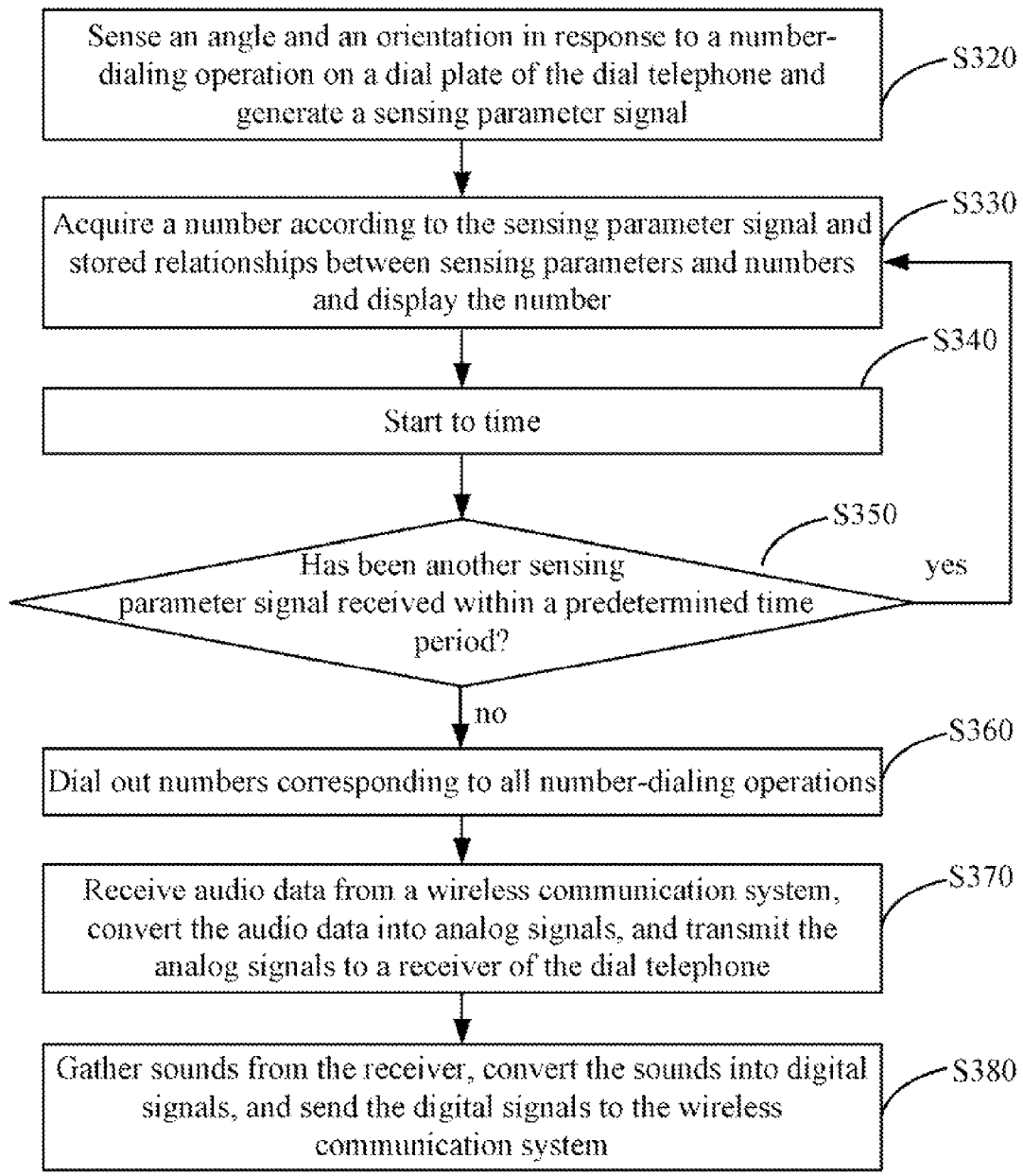
FIG. 4 is a flowchart of a method of utilizing the dial telephone in communication by the mobile phone of FIG. 2.

FIG. 4 is a flowchart of a method of utilizing a dial telephone in communication, adapted for the mobile phone of FIG. 2. In step S320, the sensing unit 15 senses the angle and the orientation through which the mobile phone 10 is rotated with the dial plate 21, in response to the number-dialing operation, and generates a sensing parameter signal. In step S330, the number acquiring module 110 acquires a number according to the sensing parameter signal from the storage unit 12 and controls the display unit 14 to display the number. In step S340, the timer 111 starts to time. In step S350, the evaluating module 112 evaluates whether another sensing parameter signal has been received within a predetermined time period. If another sensing parameter signal has been received within the predetermined time period, the procedure goes back to step S330.

If another sensing parameter signal has not been received within the predetermined time period, in step S360, the evaluating module 112 controls the communication unit 13 to dial out the numbers corresponding to the all number-dialing operations. In step S370, the digital/analog convertor 113 converts the audio data being output from the wireless communication system into analog signals and transmits the analog signals to the dial telephone 20 as audible sound via the first audio interface 16. In step S380, the analog/digital convertor 114 gathers sounds from the dial telephone 20 via the first audio interface 16, converts the sounds into digital signals, and controls the communication unit 13 to send the digital signals to the wireless communication system for onward transmission to the called party.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A mobile phone, which is positioned on a dial plate of a dial telephone and rotates as the dial plate is rotated, comprising:
    an audio interface electrically connected to the dial telephone;
    a communication unit to receive and send wireless signals via a wireless communication system;
    a storage unit to store a plurality of relationships between sensing parameters and numbers;
    a sensing unit to sense an angle and an orientation through which the mobile phone is rotated with the dial plate in response to a number-dialing operation on the dial plate and generate a sensing parameter signal;
    a number acquiring module to acquire a number according to the sensing parameter signal generated from the sensing unit and the stored relationships in the storage unit;
    an evaluating module to evaluate whether all number-dialing operations have finished, and to control the communication unit to dial out numbers corresponding to the all number-dialing operations when the all number-dialing operations have finished;
    a digital/analog convertor to receive audio data received by the communication unit from the wireless communication system, convert the audio data into analog signals, and transmit the analog signals to the dial telephone via the audio interface; and
    an analog/digital convertor to gather sounds from the dial telephone via the audio interface, convert the sounds into digital signals, and control the communication unit to send the digital signals to the wireless communication system.

2. The mobile phone as recited in claim 1, wherein the sensing unit comprises an accelerometer and an angle sensor.

3. The mobile phone as recited in claim 1, wherein the sensing unit is a three-axis gyroscope.

4. The mobile phone as recited in claim 1, further comprising a display unit, wherein the number acquiring module is further configured to control the display unit to display the number acquired from the storage unit.

5. The mobile phone as recited in claim 1, further comprising a timer to start to time when the number acquiring module acquires the number from the storage unit, wherein the evaluating module is further configured to evaluate whether another sensing parameter signal has been received within a predetermined time period and control the communication unit to dial out the numbers corresponding to all number-dialing operations when another sensing parameter has not been received within the predetermined time period.

6. A method of utilizing a dial telephone in communication for a mobile phone, wherein the mobile phone is electrically connected to a dial telephone via an audio interface and positioned on a dial plate of the dial telephone and rotates as the dial plate is rotated, and the mobile phone stores a plurality of relationships between sensing parameters and numbers; the method comprising:
    sensing an angle and an orientation through which the mobile phone is rotated with the dial plate in response to a number-dialing operation on the dial plate and generating a sensing parameter signal;
    acquiring a number according to the sensing parameter signal and the stored relationships;
    evaluating whether all number-dialing operations on the dial plate have finished;
    if the all number-dialing operations have finished, dialing out numbers corresponding to all number-dialing operations;
    receiving audio data from a wireless communication system, converting the audio data into analog signals, and transmitting the analog signals to the dial telephone via the audio interface; and
    gathering sounds from the dial telephone via the audio interface, converting the sounds into digital signals, and sending the digital signals to the wireless communication system.

7. The method of utilizing a dial telephone in communication for a mobile phone as recited in claim 6, after the step "acquiring a number according to the sensing parameter signal" further comprising:
   displaying the number.

8. The method of utilizing a dial telephone in communication for a mobile phone as recited in claim 6, the step "evaluating whether all number-dialing operations on the dial plate have finished" further comprising:
   starting to time after acquiring the number according to the sensing parameter signal;
   evaluating whether another sensing parameter signal has been received within a predetermined time period; and
   if another sensing parameter signal has not been received within the predetermined time period, dialing out the numbers corresponding to the all number-dialing operations.

\* \* \* \* \*